Patented Aug. 8, 1944

2,355,593

UNITED STATES PATENT OFFICE 2,355,593

2-PHENYL, 4-HYDROXY ANILINE AND COMPOSITIONS THEREOF

Gennady M. Kosolapoff, Dayton, Ohio, assignor to Monsanto Chemical Company, a corporation of Delaware No Drawing. Application April 9, 1941, Serial No. 387,691

5 Claims. (Cl. 260—571)

This invention relates to a new class of nitrogen-containing derivatives of diphenyl which are readily obtainable from 2-nitro diphenyl, and it relates more specifically to the compounds which, I believe, are 2-phenyl, phenyl hydroxylamine and 2-phenyl, 4-hydroxy aniline.

When nitro benzene, or a neutral salt of nitrobenzene sulfonic acid, is reduced in the presence of a mild reducing agent, such as zinc dust suspended in water, one obtains the phenyl hydroxylamine which may be re-arranged to the amino phenol with a strong acid such as sulfuric acid. When 2-nitro diphenyl is subjected to the action of the zinc in the same manner, little or no reaction takes place but upon gentle heating a vigorous action occurs which results in the formation of tar-like bodies.

I have now found that if one subjects at ordinary temperature 2-nitro diphenyl to mild reduction conditions, such as by agitating the nitro compound with zinc dust in the presence of water and a mutual solvent such as a water-soluble alcohol to which one may add advantageously a small amount of mild acidic agent such as acetic acid or ammonium chloride, there is obtained by an orderly reaction 2-phenyl, phenyl hydroxylamine. I have also found that this material may be re-arranged in the presence of strong acids to form 2-phenyl 4-hydroxy aniline.

The 2-phenyl 4-hydroxy aniline, when pure, is a nearly colorless crystal which melts at 116-117° C.; it reacts with acids to form salts; condenses with aldehydes; forms diazonium salts and possesses to a marked extent the property of inhibiting the oxidation of various organic compounds. When added in minute quantities to rubber or unstable liquid hydrocarbons, particularly coal tar and cracked petroleum cuts of motor fuel boiling range, it effectively retards deteriorating influences. Due to the fact that it is relatively insoluble in water, it has been found to be more effective, for this use in motor fuels than the corresponding C-unsubstituted 4-hydroxy aniline which is selectively extracted from the hydrocarbon mixture by the presence of water and is thereby rendered less effective in retarding the formation of gum.

According to one method of producing my new compounds, I dissolve 180 parts of 2-nitro diphenyl in 2500 parts of ethyl alcohol and then warm the solution to about 60° C. A solution containing 60 parts of ammonium chloride dissolved in 400 parts of water is then added, after which I add slowly, that is in small amounts 160 parts of zinc dust over a period of ½ hour while maintaining a temperature of 75°-78° C. The reaction is exothermic.

The stirring is continued for an additional fifteen minutes after which the solution is separated from the suspended matter as by filtration. Sufficient water is then added to the solution to throw out a yellow oil which is the 2-phenyl, phenyl hydroxylamine. The oil layer is separated and the resulting aqueous layer is then extracted with benzene to remove any remaining hydroxylamine dissolved in the aqueous layer. The product in the benzene solution and the oil layer are combined after first removing the benzene by distillation under reduced pressure thereby avoiding in so far as possible exposing the product unnecessarily to elevated temperatures.

In order to form the 2-phenyl, 4-hydroxy aniline, the hydroxylamine prepared above is added slowly to a mixture of 310 parts of concentrated sulfuric acid in 3400 parts of water while maintaining temperature of the mixture at about 80° C. for about an hour. Thereupon the mixture is quickly cooled and then neutralized to methyl orange with aqueous caustic soda after which I then add an amount of sodium bicarbonate to precipitate the product. The product may be purified further by recrystallization from benzol or by other known methods. A nearly colorless crystalline product is thus obtained which becomes discolored slightly upon exposure to air. In its pure form, it melts at 116-117° C.

The product may also be obtained by the iron or catalytic reduction of 2-phenyl 4-hydroxy nitro benzene.

The identity of the new compounds contemplated by my invention is established by a series of reactions carried out as follows:

By treating 2 phenyl phenol with nitrous acid, the oxime of 2-phenyl quinone-1,4 (I) may be prepared thus:

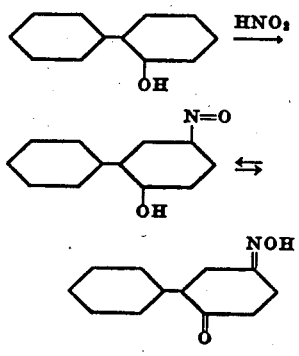

I. Oxime of 2-phenyl quinone-1,4.

By treating 2 phenyl phenol with nitric acid and reducing the nitro compound with tin and hydrochloric acid to the amino compound, the 2 phenyl, 4 amino phenol, (III) is obtained:

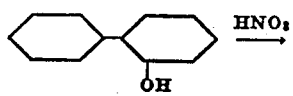

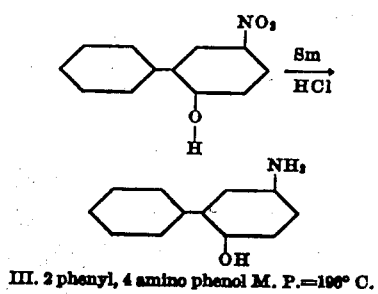

III. 2 phenyl, 4 amino phenol M. P.=196° C.

Compound III upon oxidation with chromic and sulfuric acid forms (II) 2-phenyl quinone-1,4:

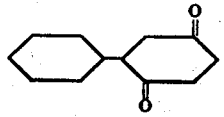

II. 2 Phenyl quinone-1,4 M. P.=114° C.

Likewise compound I above, upon reduction with tin and hydrochloric acid will form compound III which establishes the fact that the substituents are in the same positions in the ring.

Now my compound (IV)

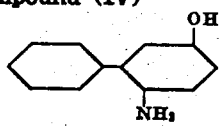

2-phenyl, 4-hydroxy aniline, upon treatment with chromic and sulfuric acid also yields a compound the 2 phenyl quinone-1,4, having a melting point of 114° C., which is established by a mixed melting point with compound II prepared from the 2 phenyl phenol. Therefore since my new compound has a melting point of 116—117° C. which is different from that of compound III, it must have the structure indicated at IV above.

To illustrate the effectiveness of the new material as a motor fuel gum inhibitor, a freshly cracked gasoline was used which was extracted with 10% caustic soda to remove the natural inhibitors. The fuel had an induction period of 435 minutes, a copper dish gum of 100 mg. per 100 cc., and a glass dish gum of 1.6 mg. per 100 cc. before the caustic treatment; following the caustic treatment, the induction period fell to 135 minutes, the copper dish gum increased to 263 mg. per 100 cc., and the glass dish gum to 2.8.

The following table gives the results of a series of comparative tests in which the amount of inhibitor is varied and compared with known present day inhibitors. It will be apparent from the foregoing table that on a weight basis, my amino phenol derivative is superior to the substituted catechol or alpha naphthol.

| Quantity #/1000, bbls. | Alpha naphthol | | Poly alkylated catechol | | 2-phenyl-4-hydroxy aniline | |
|---|---|---|---|---|---|---|
| | Induction period in minutes | Copper dish, mg./100 cc. | Induction period in minutes | Copper dish, mg./100 cc. | Induction period in minutes | Copper dish, mg./100 cc. |
| 0 | 135 | 263 | 135 | 263 | 135 | 263 |
| 2 | 165 | 272 | 135 | 212 | 195 | 644 |
| 4 | 180 | 353 | 150 | 206 | 255 | 486 |
| 7 | 235 | 310 | 150 | 221 | 355 | 259 |
| 10 | 290 | 110 | 145 | 251 | 390 | 15 |
| 20 | 390 | 74 | 180 | 341 | 510 | 13 |
| 30 | 505 | 15 | 170 | 293 | 685 | 17 |
| 40 | 560 | 29 | 180 | 214 | 780 | 20 |
| 50 | 670 | 16 | 185 | 67 | 910 | 20 |

The foregoing table illustrates the increased effectiveness on a weight basis of my new compound as compared to naphthol or the poly alkylated catechol. In actual commercial use, the amount required will depend on the condition of the cracked stock and the degree of protection required as measured by the induction period and copper dish tests. The physical handling and addition of the inhibitor to the motor fuel is essentially the same as now commonly practiced. The material may be added as a solution in alcohol, benzol or naphtha and may be admixed with other known inhibitors such as cresylic acid, wood tar acid, alpha naphthol, et al. The motor fuel may be straight run or blend and may contain ethyl fluid.

What I claim is:

1. The process of producing 2-amino-5-hydroxydiphenyl comprising reducing 2-nitrodiphenyl by the action of an aqueous suspension of zinc in the presence of a common solvent to produce 2-hydroxylaminodiphenyl, then effecting a re-arrangement of said hydroxylaminodiphenyl by treatment of the same in an aqueous solution of sulfuric acid.

2. The compound: 2 - amino - 5 - hydroxydiphenyl.

3. The process of producing 2-amino-5-hydroxydiphenyl comprising subjecting 2-nitrodiphenyl to mild reducing conditions to produce 2-hydroxyl aminodiphenyl, then effecting a rearrangement of said hydroxylaminodiphenyl by treatment of same in an aqueous solution of a strong acid.

4. The process of producing 2-amino-5-hydroxydiphenyl comprising reducing 2-nitrodiphenyl by the action of an aqueous suspension of zinc in the presence of a common solvent to produce 2-hydroxylaminodiphenyl, then effecting a rearrangement of said hydroxylaminodiphenyl by treatment of the same in an aqueous solution of a strong acid.

5. The process according to claim 4 in which a small amount of an acidic agent is added to the reducing mixture.

GENNADY M. KOSOLAPOFF.